United States Patent [19]
Samueli et al.

[11] Patent Number: 6,144,712
[45] Date of Patent: *Nov. 7, 2000

[54] VARIABLE RATE MODULATOR

[75] Inventors: Henry Samueli, San Juan Capistrano; Joseph I. Laskowski, Newport Beach, both of Calif.

[73] Assignee: Broadcom Corporation, Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,101

[22] Filed: Oct. 9, 1997

[51] Int. Cl.$^7$ ........................................... H04L 7/00
[52] U.S. Cl. ............................................. 375/371; 364/723
[58] Field of Search ..................... 375/371, 308, 375/329, 279, 226; 364/723, 179, 724.11; 341/61, 123; 332/103

[56] References Cited

U.S. PATENT DOCUMENTS

| | | | |
|---|---|---|---|
| 5,412,352 | 5/1995 | Graham | 332/103 |
| 5,479,457 | 12/1995 | Waters | 375/372 |
| 5,500,892 | 3/1996 | Essig | 379/345 |
| 5,519,732 | 5/1996 | Chester | 375/295 |
| 5,606,319 | 2/1997 | Yatim | 341/144 |
| 5,748,126 | 5/1998 | Ma et al. | 341/143 |
| 5,764,113 | 6/1998 | Snell | 332/103 |
| 5,768,328 | 6/1998 | Nielsen | 375/376 |
| 5,783,974 | 7/1998 | Koslov et al. | 332/103 |

OTHER PUBLICATIONS

H. Samueli, T. Lin, R. Hawley, and S. Olafson, "VSLI Architectures For A High–Speed Tunable Digital Modulator/Demodulator/Bandpass–Filter Chip Set", Integrated Circuits and Systems Laboratory Electrical Engineering Department University of California, Los Angeles (ISCAS'92). (3 pages).

*Primary Examiner*—William A. Luther
*Assistant Examiner*—Emmanuel Bayard
*Attorney, Agent, or Firm*—Christie, Parker & Hale, LLP

[57] ABSTRACT

Digital data signals at a variable input frequency are converted by a numerically controlled oscillator and an interpolator to a signal at a fixed output sampling frequency. The conversion of the variable input frequency to the fixed output sampling frequency may be by a factor other than an integer. The interpolated digital data signals at the fixed output sampling frequency are then modulated into a pair of trigonometric signals at a programmable carrier frequency, one signal having a cosine function and the other signal having a sine function. The modulated signals at the fixed output sampling frequency are then combined to create a modulated signal at a carrier frequency determined by the frequency of the sine and cosine signals. The modulated signal is sampled at the fixed output sampling frequency and converted to a corresponding analog signal using a digital-to-analog converter.

26 Claims, 4 Drawing Sheets

VARIABLE RATE MODULATOR

This invention relates to a system including a variable rate modulator for (1) varying the rate at which signals are modulated in accordance with variations in the rate of introduction of digital data to the system and (2) for processing the modulated signals to provide output signals at a fixed sampling frequency.

BACKGROUND OF THE INVENTION

In recent years, a number of different applications have arisen in which digital signals representing data are processed and the processed signals are then converted to analog signals. For example, such applications have included the transmission of television signals through coaxial lines to homes. In such systems, the digital data is converted to analog signals and the analog signals are then transmitted through coaxial lines to homes of subscribers. Other applications are in microwave links and satellite communications.

In a number of the different applications involving the processing of digital data and the conversion of the processed digital data to analog signals, the digital data is provided at a variable input frequency or rate and the analog signals are provided at a fixed sampling frequency different from the variable input frequency or rate. For example, the digital data may be provided in the range of approximately 0.1–20 megabits per second and the analog signals may be sampled at a fixed frequency in the range of approximately 100–200 megahertz.

In the above example, the variable rate digital signals in the range of 0.1–20 megabits/second are converted to a modulated analog intermediate frequency signal having a fixed sampling frequency. For example, the digital signals in the range of 0.1–20 megabits/second may be converted to signals at a fixed sampling frequency of approximately 100–200 megahertz. The signals at the sampling frequency are then modulated onto a programmable carrier frequency in the range of approximately 5–65 MHz. at the fixed sampling frequency of approximately 100–200 megahertz.

As will be seen from the above discussion, a considerable range of frequencies (e.g. 0.1–20 megabits/second) have to be converted to a single fixed frequency (e.g. 120 megahertz). This is not easy. If the conversion is not accurate, the signals at the fixed sampling frequency jitter. When the signals illustratively provide television information, the jitter produces a significant deterioration in the quality of the television image.

BRIEF DESCRIPTION OF THE INVENTION

This invention provides a system for, and method of, converting digital data signals variable through a wide range of frequencies or rates into signals at a fixed sampling frequency. This conversion occurs without any jitter in the signals at the fixed sampling frequency. When the system of this invention is illustratively used to provide television images, the television images have a high resolution.

In one embodiment of the invention, digital data signals at a variable input frequency are converted by a numerically controlled oscillator and an interpolator to a signal at a fixed sampling frequency. The conversion of the variable input frequency to the fixed output sampling frequency may be by a factor other than an integer.

The interpolated digital data signals at the output sampling frequency are then modulated onto a pair of trigonometric signals at a programmable carrier frequency, one signal having a cosine function and the other signal having a sine function.

The modulated pair of trigonometrically related signals at the fixed sampling frequency are then combined to create a modulated signal at a carrier frequency determined by the frequency of the sine and cosine signals. The modulated signal is sampled at the fixed sampling frequency and converted to a corresponding analog signal using a digital-to-analog converter.

DETAILED DESCRIPTION OF THE INVENTION

Figure 1:
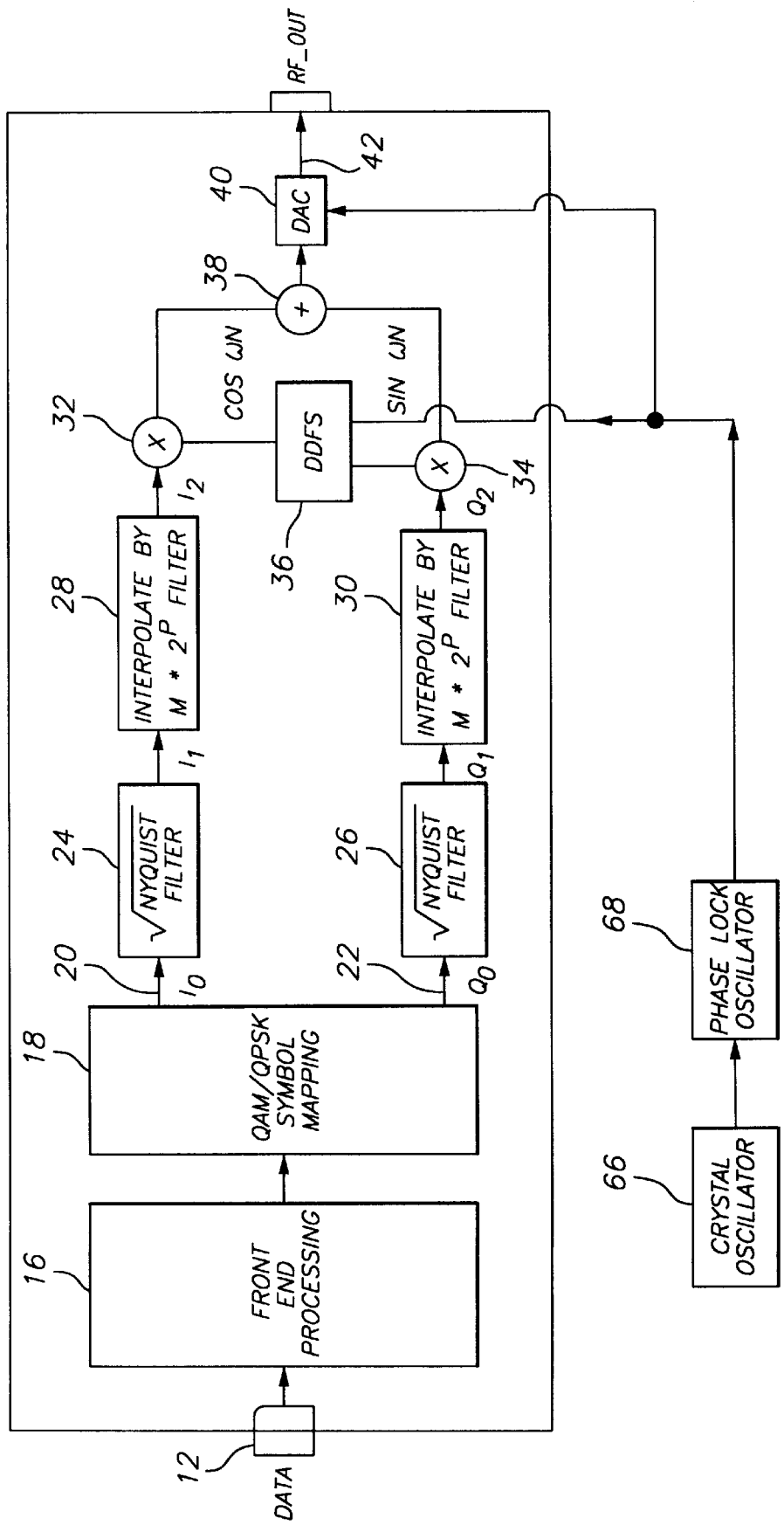
FIG. 1 is a circuit diagram, primarily in block form, of a system constituting an embodiment of the prior art.

FIG. 1 shows a system, generally indicated at 10, of the prior art for transmitting digital data at a variable frequency, for processing the digital data and for converting the digital data at a fixed sampling frequency to an analog signal. In the system 10, the digital data is provided at the variable frequency on a line 12. This variable frequency may vary through a range such as approximately 0.1–20 megabits per second. Several processing functions are then performed on the data in a well known manner and are indicated by a stage 16 designated as front-end processing. For example, these processing functions may include a data scrambler, a forward error correction encoder and a stage which inserts a preamble in the data stream to achieve synchronization at the receiver.

The signals from the stage 16 are then introduced to a stage 18 which may be constructed in a well known manner. The stage 18 is designated as QAM (quadrature amplitude modulation)/QPSK (quadrature phase shift keying) symbol mapping. The stage 18 operates upon the digital data signals from the stage 16 to produce signals having various amplitude levels, such as ±1 or ±3. Such signals with such amplitude levels are produced in such environments as coaxial television lines. Pairs of signals at such amplitude levels are produced by the stage 18. The signals from the stage 18 are respectively designated as $I_0$ $Q_0$.

The output signals from the symbol mapping stage 18 on lines 20 and 22 are respectively introduced to square root Nyquist filters 24 and 26 which are well known in the art.

The square root Nyquist filters constitute low pass filters. The signals from the stages 24 and 26, designated as $I_1$ & $Q_1$, respectively, are then respectively introduced to interpolation filters 28 and 30 which may also be constructed in a well known manner in the prior art embodiment shown in FIG. 1. Each of the filters 28 and 30 may constitute a plurality of stages each multiplying, by an integer, the sampling frequency of the signals introduced to it. For example, each of the filters 28 and 30 may constitute P stages each operative to multiply by the integer 2 the sampling frequency of the signals introduced to it.

Thus, the interpolation filters 28 and 30 may multiply the sampling frequency of the signals by a value $M*2^P$. In the above equation, M may constitute an integer by which one of the stages in each of the interpolation filters 28 and 30 multiplies the sampling frequency. The interpolation filters 28 and 30 respectively provide signals designated as $I_2$ and $Q_2$.

The signals from the interpolation filters 28 and 30, respectively designated $I_2$ and $Q_2$, are respectively introduced to multipliers 32 and 34. The multipliers also receive signals from a direct digital frequency synthesizer (DDFS) 36 which provides cosine and sine signals at a frequency which may be considered to constitute a carrier frequency. The cosine and sine signals introduced to the multipliers 32 and 34 from the synthesizer 36 are respectively multiplied with the signals $I_2$ and $Q_2$ from the filters 28 and 30. The multipliers 32 and 34 respectively modulate the $I_2$ and $Q_2$ signals from the filters 28 and 30 onto the carrier frequency of the signals from the frequency synthesizer 36. This carrier frequency is programmable and may be in the range of approximately 5–65 megahertz.

The modulated signals from the multipliers 32 and 34 pass to an adder 38. The resultant signal from the adder 38 is converted to an analog signal in a digital-to-analog converter 40 and the analog signal is introduced to an output line 42. As will be seen from the subsequent discussion, the signals from the frequency synthesizer 36 are at a fixed sampling frequency and the signals from the adder 38 are sampled at this fixed sampling frequency to produce an analog signal.

As previously indicated, the data signal on the line 12 has a variable input frequency. The signals from the interpolation filters 28 and 30 preferably have a fixed output sampling frequency. As will be apparent, the interpolation filters 28 and 30 cannot provide a fixed output sampling frequency when the signals on the lines 20 and 22 have a variable input frequency and the interpolation filters 28 and 30 provide sampling frequency multiplication by integer numbers. This has accordingly provided serious operational limitations in the prior art. For example, it has introduced jitters into the signals at the output sampling frequency from the interpolate filters 28 and 30 and thus has produced jitters at the output line 42. When the signals at the output line 42 constitute television signals, the television signals have accordingly been blurred.

This invention provides a system for, and methods of, maintaining the frequency of the signals introduced to the stages 32 and 34 fixed even when the rate or frequency of the data signals 12 varies over a range as high as approximately 0.1–20 megabits per second. The system of this invention is generally indicated at 48 in FIG. 2. The system 48 is identical to the system 10 of FIG. 1 except that it includes interpolation filters 50 and 52 each of which includes a plurality of stages and each of which is intended to be substituted for a corresponding one of the filters 28 and 30 in FIG. 1.

All of the stages in the filters 50 and 52 (except the last stage) interpolate by an integer such as a value of 2. For example, there may be stages each of which interpolates by a value of 2 or 3. The last stage interpolates by a value which may or may not be an integer. This value may be represented by M/N where M and N are integers. By providing an interpolation ratio of M/N, the filters 50 and 52 can provide signals at the desired fixed output sampling frequency such as 120 megahertz even when the input sampling frequency can vary in the range of approximately 0.1–20 megahertz.

Figure 3:
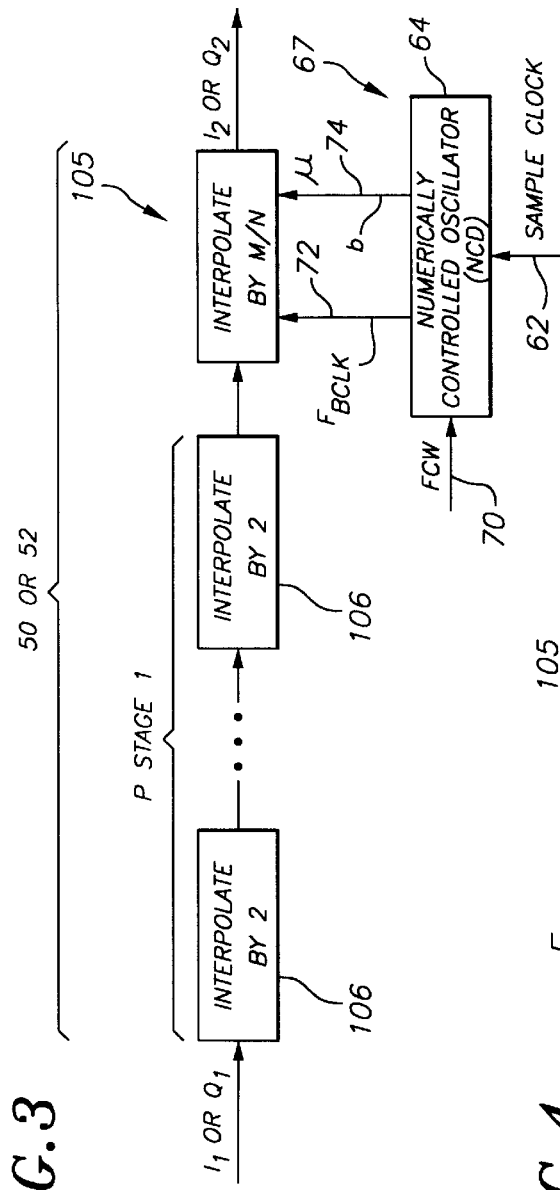
FIG. 3 is a circuit diagram, primarily in block form, of certain features included in the system constituting one embodiment of this invention to provide the significant difference between the system of this invention and the system of the prior art.

The last interpolation stage in the system of this invention is indicated generally at 67 and 105 in FIG. 3. It includes a numerically controlled oscillator 64. The oscillator 64 may be considered to be the digital equivalent of a voltage controlled oscillator in that it provides oscillatory signals at a variable frequency dependent upon digital inputs to the oscillator. The construction and operation of numerically controlled oscillators such as the oscillator 64 are well known in the art.

Figure 2:
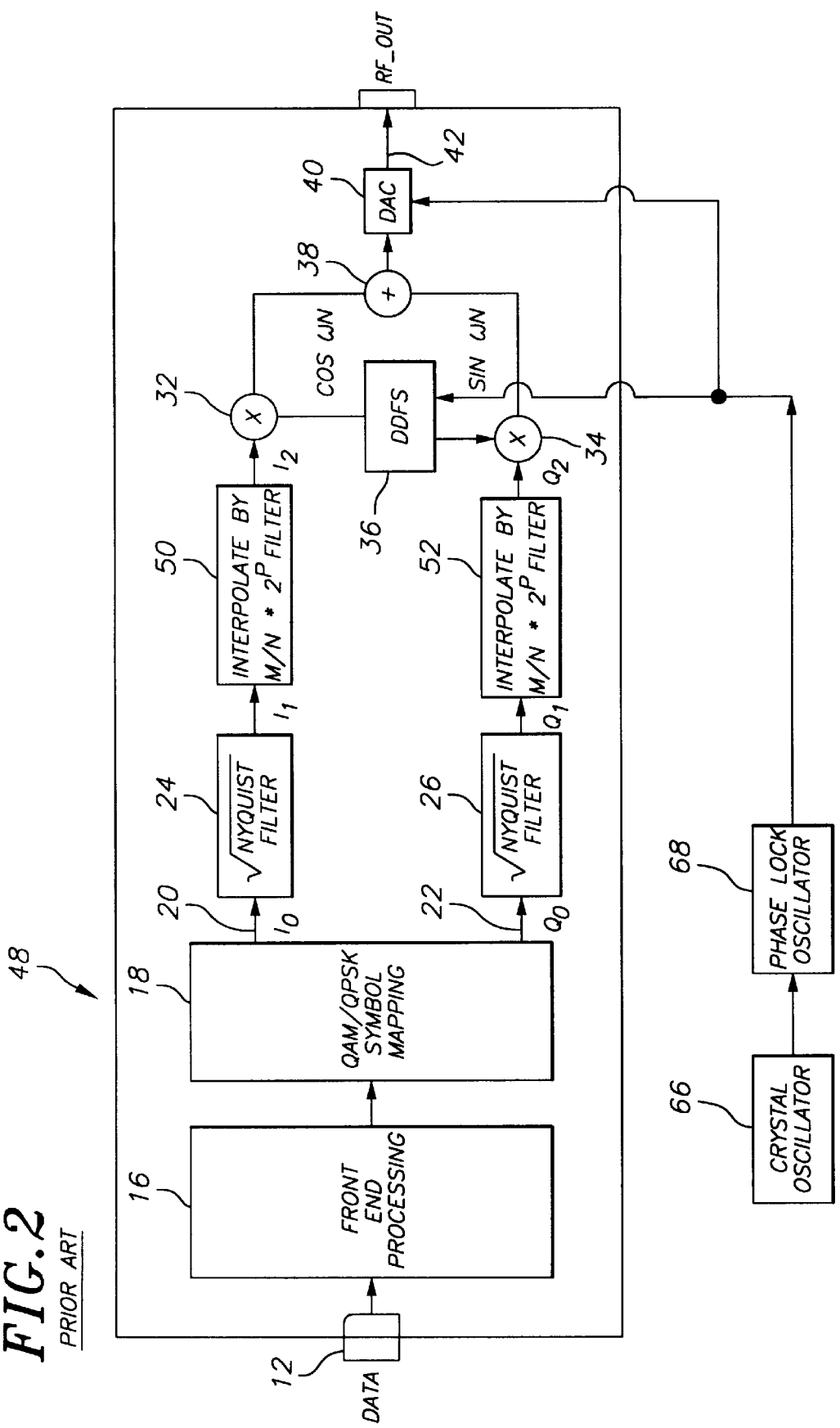
FIG. 2 is a circuit diagram, primarily in block form, of a portion of the system similar to that shown in FIG. 1 and shows a significant difference between the system of this invention and the system of the prior art.

The numerically controlled oscillator 64 receives several inputs. For example, the numerically controlled oscillator 64 receives a clock signal at a fixed frequency on a line 62 such as a signal from the crystal oscillator 66 (FIGS. 1 and 2). The frequency of the signal from the oscillator 66 can be multiplied by a phase lock loop each as the phase lock loop 68 (FIGS. 1 and 2) well known in the art. The signals at the multiplied frequency from the phase lock loop 68 are introduced to the direct digital frequency synthesizer (DDFS) 36 and to the digital-to-analog converter 40 shown in FIGS. 1 and 2. The frequency of such signals may be represented as $F_{SAMPLE\_CLK}$.

The numerically controlled oscillator 64 also receives input signals from a line 70. These signals may be designated as a frequency control word (FCW). The line 70 provides control signals FCW so that output clock signals can be provided on a line 72 at a substantially constant frequency represented by the FCW and corresponds to the baud or symbol rate of the input data 80. This frequency may be designated as $F_{BCLK}$.

Output signals are also provided from the numerically controlled oscillator 64 on a line 74. The output signals on the line 74 represent a value $\mu$ greater than or equal to 0 and less than 1. This value will be described in detail subsequently. For the time being, it may be considered to represent the phase offset between the sample clock on the line 62 and the $F_{BCLK}$ signal on the line 72. The value $\mu$ changes on every sample clock cycle.

$F_{BCLK}$ on the line 72 may be represented as $$F_{BCLK} = \frac{FCW}{2^B} \times F_{SAMPLE\_CLK} \text{ where} \tag{1}$$

$B$ = a fixed number such as twenty four (24) bits.

Equation 1 may be converted to $$F_{BCLK} = \frac{M}{N} \times F_{SAMPLE\_CLK} \text{ where} \tag{2}$$

$M$ may be considered as equal to $FCW$ and
$N$ may be considered as equal to $2^B$.

The value $M = FCW$ may be then represented as

-continued $$M = \frac{(F_{BCLK})(N)}{F_{SAMPLE\_CLK}} \quad (3)$$

In this way, the operation of the numerically controlled oscillator 64 is varied so that the proper value of FCW on line 70 is provided to obtain the value of $F_{BCLK}$ at the output of the oscillator.

Figure 4:
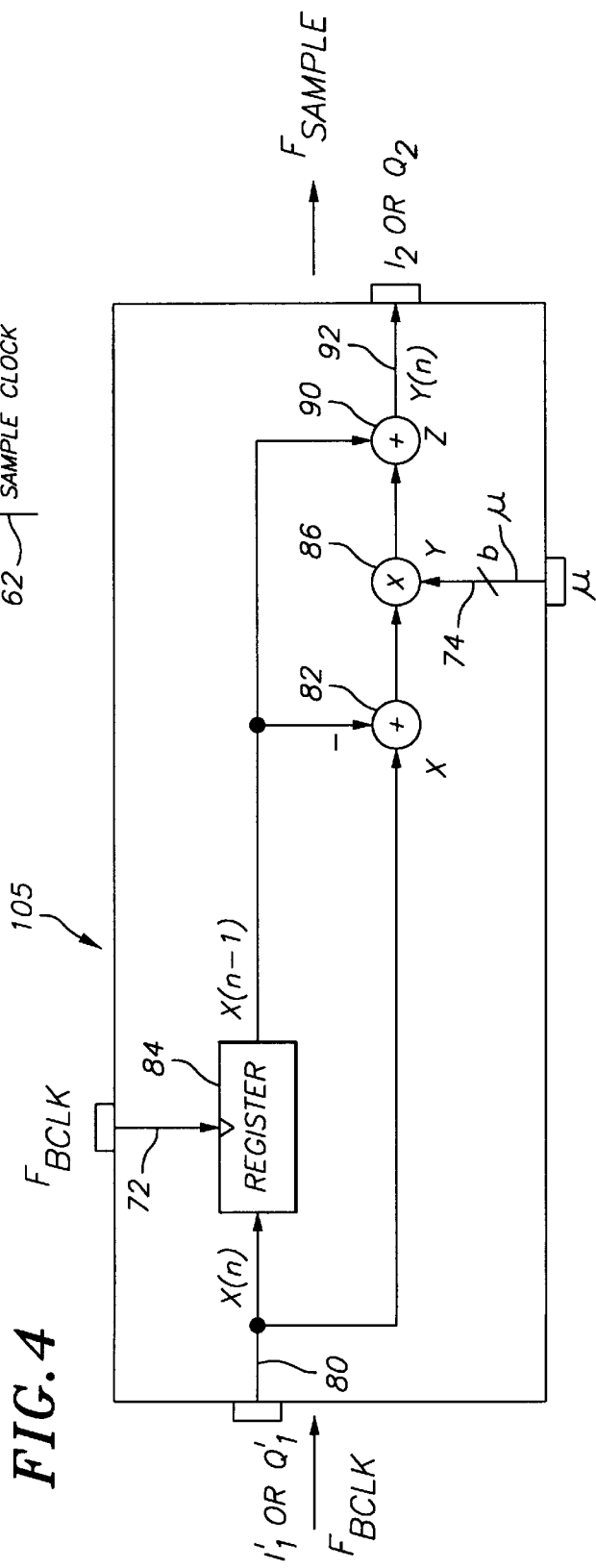
FIG. 4 is a circuit diagram, primarily in block form, of other features included in the system constituting one embodiment of this invention to provide the significant difference between the system of this invention and the system of the prior art.

FIG. 4 illustrates an example of the interpolation filter 105 in FIG. 3. The output from the last by way of example, interpolate-by-2 stage 106 in FIG. 3 is introduced at 80 to an adder 82 and the input terminal of a register 84 in FIG. 4. The register 84 is clocked by the output signal $F_{BCLK}$ on the line 72 from the numerically controlled oscillator 64 in FIG. 3. The negative value of the output from the register 84 is also introduced to the adder 82 in FIG. 4.

The adder 82 accordingly provides an output represented as $$x(n)-x(n-1) \text{ where} \quad (4)$$

x(n) represents the current input sample on the line 80 and x(n−1) represents the previous input sample on such line. The value of x(n)−x(n−1) is then multiplied in the multiplier 86 to provide a value of $\mu[x(n)-x(n-1)]$.

As previously indicated, $\mu$ is a value greater than or equal to 0 and less than 1. It constitutes the difference in phase between the sample clock 62 and the BCLK signal on the line 72 in FIG. 3. For example, the significance of $\mu$ may be seen from the following illustrative relationship between the fixed output sample clock signal on the line 62 and the variable rate clock signal $F_{BCLK}$ on the line 72:

$$F_{72}=1/4F_{62} \text{ where} \quad (6)$$

$F_{72}$=the frequency of the clock on the line 72 and $F_{62}$=the frequency of the sample clock on the line 62. In successive clock signals, $\mu$ will then be 0, 1/4, 1/2, 3/4, 0, 1/4, 1/2, etc. The $\mu$ signal on the line 74 and the output from the adder 82 are multiplied in the multiplier 86 in FIG. 4. The output from the multiplier 86 passes to an adder 90 which also receives the output x(n−1) from the register 84 to provide an output on a line 92 of $$y(n)=x(n-1)+\mu[x(n)-x(n-1)] \text{ where} \quad (5)$$

y(n) is an interpolated value between x(n) and x(n−1).

Figure 5:
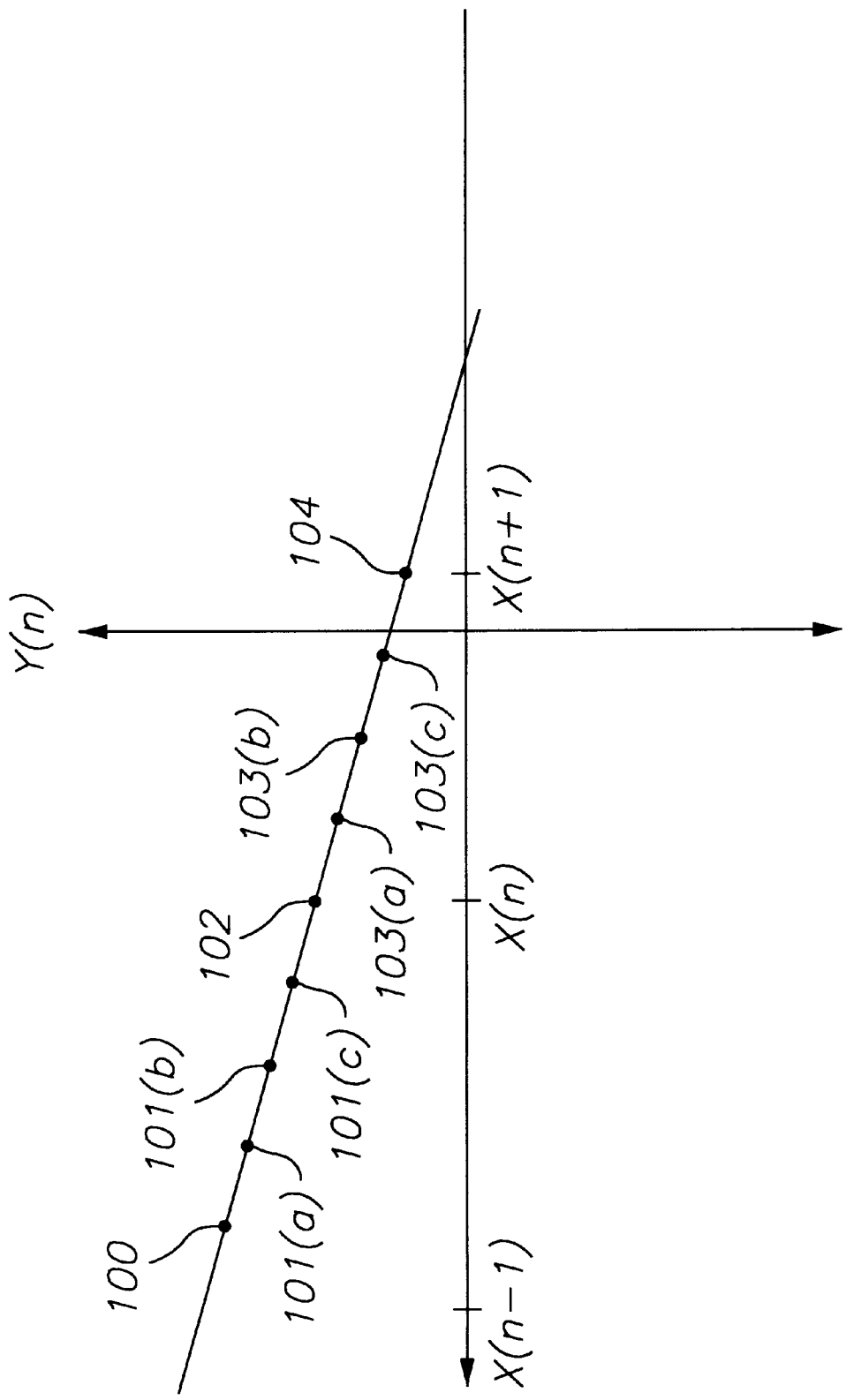
FIG. 5 shows a curve illustrating how the system of this invention provides a linear interpolation between successive values introduced to the system, thereby enhancing the resolution by the system of this invention of the image represented by the data signals introduced to the system.

FIG. 5 illustrates at 100, 102, and 104 the data signals on the line 80. FIG. 5 also illustrates at 101a, 101b and 101c the signals interpolated between the input signals 100 and 102 and at 103a, 103b and 103c the signals interpolated between the input signals 102 and 104. The interpolated signals 101a, 101b and 101c and the interpolated signals 103a, 103b and 103c are provided when $\mu$=1/4, 1/2, 3/4 as discussed above.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A modulator, comprising:
   first means for providing data inputs at a variable frequency,
   second means for providing clock signals at a sample clock frequency,
   a numerically controlled oscillator responsive to further data inputs representing the variable frequency and the clock signals at the sample clock frequency for providing clock signals at a fixed output sampling rate, and including third means for providing a signal representing an offset in phase between the clock signals at the fixed output sampling rate and the clock signals at the variable frequency, and
   an interpolator responsive to the offset in phase signals at the sample clock frequency for converting the variable frequency data input to an interpolated signal at a fixed sampling frequency, and
   wherein the interpolator includes fourth means for providing offsets between pairs of the data inputs at the variable frequency in accordance with the signal representing the phase offset between the clock signals at the fixed sampling rate and the clock signals at the variable frequency.

2. A modulator as set forth in claim 1, further comprising:
   fifth means for converting to an analog format at the fixed output sampling rate the data signals processed at the fixed output frequency.

3. A modulator as set forth in claim 3, further comprising:
   sixth means for adding the offset provided by the fourth means of the pairs of the data inputs at the variable frequency and the earlier of the data inputs in the pairs to obtain an interpolation of the data inputs at the fixed sampling frequency.

4. A modulator, comprising:
   first means for providing at a first variable input frequency pairs of binary bits representing data, each pair of binary bits representing an individual one of a plurality of particular amplitude levels,
   second means for converting the successive pairs of the binary bits to the individual ones of the plurality of amplitude levels representative of such binary bits,
   third means for providing sampling signals at a second fixed frequency,
   sixth means for interpolating each pair of the digital signals at the second fixed frequency by a non-integer value in accordance with the indication provided by the fifth means,
   seventh means for varying the operation of the numerically controlled oscillator to obtain the output from the sixth means at the second fixed frequency even with variations in the third variable frequency, and
   eighth means for modulating the interpolated signals onto trigonometric signals at the second fixed frequency and combining the modulated signals to generate a digital signal, modulated at the second fixed frequency, at a carrier frequency dependent upon the frequency of the trigonometric signals, and
   ninth means including a digital-to-analog converter for converting the modulated digital signal to an analog signal.

5. A modulator as set forth in claim 4, wherein
   the seventh means provides for changes by the numerically controlled oscillator in accordance with changes in the third variable frequency to obtain the signals at the second fixed frequency.

6. A modulator as set forth in claim 4, wherein,
   the eighth means provides the trigonometric signals at a carrier frequency and modulates these trigonometric signals with the interpolated signals a the second fixed frequency and wherein the eighth means adds the modulated trigonometric signals to produce a resultant signal at the carrier frequency and wherein the ninth means samples the resultant signal to produce the analog signal.

7. A modulator as set forth in claim 4, wherein the seventh means includes an input to the numerically controlled oscillator, the input being variable in accordance with the third variable frequency to obtain the signals at the second fixed frequency and wherein the eighth means provides trigonometric signals at a carrier frequency and modulates these trigonometric signals with the interpolated signals at the second fixed frequency and wherein the eighth means adds the modulated trigonometric signals to produce a resultant signal at the carrier frequency and wherein the ninth means samples the resultant signal at the second frequency to produce the analog signal.

8. A modulator, comprising:

first means for providing at a variable rate pairs of binary bits, each pair representing an individual one of a plurality of amplitude levels, second means for converting the successive pairs of the binary bits to the individual ones of the amplitude levels in the plurality at a first variable frequency, third means for providing values greater than or equal to 0 and less than 1, such values representing the location of interpolations to be provided between each pair of the individual ones of the amplitude levels in the plurality, fourth means for providing clock signals at a third fixed sampling rate, fifth means for providing the individual ones of the amplitude levels at a second variable frequency, sixth means for providing interpolations between each pair of the individual ones of the amplitude levels in the plurality in accordance with the values provided by the third means, seventh means for providing a frequency conversion, by a value other than an integer, of the amplitude levels at the second variable frequency to the amplitude levels at a frequency which is substantially constant regardless of any variations in the second variable frequency and eighth means for sampling the amplitude levels provided at the substantially constant frequency.

9. A modulator as recited in claim 8, wherein the seventh means includes a numerically controlled oscillator responsive to the clock signal at the fixed sampling rate to obtain the production of the individual ones of the amplitude levels at the substantially constant frequency.

10. A modulator as set forth in claim 8, wherein the sixth means provides the interpolations of the individual ones of the amplitude levels at the substantially constant frequency.

11. A modulator as set forth in claim 8, wherein the seventh means includes a numerically controlled oscillator responsive to the clock signals at the fixed sampling rate to obtain the production of the individual ones of the amplitude levels at the substantially constant frequency and wherein the sixth means provides the interpolations of the individual ones of the amplitude levels at the substantially constant frequency.

12. A modulator, comprising:

first means for providing digital data signals at a variable input frequency, second means for converting the digital data signals at the variable input frequency to signals having a particular number of different amplitude levels at a second variable frequency, third means responsive to the signals at the second variable frequency for converting such signals, by value other than an integer, to signals at a substantially constant frequency, fourth means for interpolating at the substantially constant frequency the signals from the second means at the different amplitude levels, and fifth means for processing the signals at the different amplitude levels at the substantially constant frequency to produce an analog output signal.

13. A modulator as set forth in claim 12, further comprising:

means for providing a clock signal at a fixed frequency, and wherein the third means include a variably controlled oscillator responsive to the clock signal and wherein the third means provides for the introduction to the numerically controlled oscillator of a signal having a frequency variable to obtain the production of the signal at the substantially constant frequency.

14. A modulator as set forth in claim 13, further comprising:

sixth means for converting the frequency of the data signals at the second variable frequency to the substantially constant frequency after the operation of the second means in converting the digital data signals at the variable input frequency to data signals having different amplitude levels at the second variable frequency.

15. A modulator as set forth in claim 13, wherein sixth means for producing trigonometric signals at the third fixed sampling rate and for modulating the trigonometric signals with the interpolated signals to produce a resultant signal at a programmable carrier frequency and wherein the fifth means samples the resultant signal at the substantially constant frequency rate to produce the analog output signal.

16. A modulator as set forth in claim 14, wherein the sixth means includes means for producing trigonometric signals at a fixed sampling rate and for modulating the trigonometric signals with the interpolated signals to produce a resultant signal at a programmable carrier frequency and wherein the fifth means samples the resultant signals at the substantially constant frequency to produce the analog output signal.

17. A modulator, comprising:

first means for providing at a variable rate pairs of binary bits, each pair representing an individual one of a plurality of amplitude levels, second means for converting the successive pairs of the binary bits to individual ones of the amplitude levels in the plurality at a second variable frequency, third means for providing clock signals at a fixed frequency, fourth means for providing signals at a substantially constant frequency dependent upon the second variable frequency, fifth means responsive to the clock signals at the fixed frequency for providing signals at a second variable frequency to obtain the signals at the substantially constant frequency from the fourth means, and sixth means for interpolating the individual ones of the amplitude levels at the substantially constant frequency by a non-integer value.

18. A modulator as set forth in claim 17, further comprising:

seventh means for providing a value greater than or equal to 0 and less than 1, such value representing the location of interpolations to be provided between each pair of the individual ones of the amplitude levels in the plurality, the sixth means including eighth means responsive to the values from the seventh means for providing the interpolations between each pair of the individual ones of the amplitude levels in the plurality at the locations represented by such values.

19. A modulator as set forth in claim 18, wherein the fifth means includes a numerically controlled oscillator responsive to the clock signals at the fixed frequency for providing adjustments in the second variable frequency to obtain the signal at the substantially constant frequency from the fourth means.

20. A modulator as set forth in claim 18, further comprising means for converting the amplitude levels and the interpolations of the amplitude levels to an analog value.

21. A modulator as set forth in claim 19 further comprising seventh means for converting the amplitude levels and the interpolations of the amplitude levels to an analog value.

22. A modulation system comprising:

first means for providing data inputs at a first variable frequency, second means responsive to the data inputs at the first variable frequency for providing data inputs at a substantially constant frequency regardless of the variations in the first frequency, third means for providing a clock signal at a fixed frequency, fourth means responsive to the clock signal at the fixed frequency and the substantially constant frequency for providing signals at a second variable frequency to obtain the data output at the substantially constant frequency, and an interpolator responsive to the signals at the second variable frequency and the clock signals at the fixed frequency for providing an interpolation of the data inputs at the second variable frequency by a non-integer value to obtain the data outputs at the substantially constant frequency.

23. The system as set forth in claim 22, the fourth means including a numerically controlled oscillator responsive to the clock signals at the fixed frequency for adjusting the value of the second variable frequency to provide for the data outputs at the substantially constant frequency.

24. The system as set forth in claim 23 wherein means are included for providing a value equal to or greater than 0 and less than 1, the interpolator being responsive to such value and to the data outputs for providing an interpolation of the data inputs in accordance with such value to obtain the interpolated data outputs.

25. The system as set forth in claim 24, including means for converting the data outputs to analog values.

26. The system as set forth in claim 23, the numerically controlled oscillator providing a value indicating the number of progressive interpolations to be provided between such successive pair of data inputs, and the interpolator being operative to provide the progressive interpolations between each successive pair of data inputs in accordance with the value provided by the numerically controlled oscillator.

* * * * *

UNITED STATES PATENT AND TRADEMARK OFFICE
CERTIFICATE OF CORRECTION

PATENT NO.   : 6,144,712
DATED        : November 7, 2000
INVENTOR(S)  : Henry Samueli et al.

It is certified that error appears in the above-identified patent and that said Letters Patent is hereby corrected as shown below:

<u>Title page,</u>
Item [75], Inventor, replace "Joseph I. Laskowski" with -- Joseph L. Laskowski --

Signed and Sealed this

Seventeenth Day of February, 2004

JON W. DUDAS
*Acting Director of the United States Patent and Trademark Office*